US011186361B2

(12) United States Patent
Pizana et al.

(10) Patent No.: US 11,186,361 B2
(45) Date of Patent: Nov. 30, 2021

(54) AIRCRAFT LANDING GEAR PROVIDED WITH MEANS FOR ROUTING CABLES AND PIPES

(71) Applicant: SAFRAN LANDING SYSTEMS, Velizy Villacoublay (FR)

(72) Inventors: Pierre Pizana, Moissy-Cramayel (FR); Yvain Serignac, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 276 days.

(21) Appl. No.: 16/430,178

(22) Filed: Jun. 3, 2019

(65) Prior Publication Data
US 2019/0367162 A1    Dec. 5, 2019

(30) Foreign Application Priority Data

Jun. 4, 2018   (FR) ...................................... 1854843

(51) Int. Cl.
*B64C 25/40* (2006.01)
*B64C 25/00* (2006.01)

(52) U.S. Cl.
CPC .......... *B64C 25/405* (2013.01); *B64C 25/001* (2013.01)

(58) Field of Classification Search
CPC ........ B64G 2204/201; B64G 2204/202; B64C 25/405; B64C 25/001; B64C 25/44; B64C 25/58
See application file for complete search history.

(56) References Cited

U.S. PATENT DOCUMENTS

| 2003/0102406 | A1* | 6/2003 | Chow | B64C 25/001 244/1 OOR |
| 2010/0012778 | A1* | 1/2010 | Chow | B64C 25/60 244/1 N |
| 2011/0309193 | A1* | 12/2011 | Seror Goguet | B64C 25/001 244/1 OOR |
| 2012/0043418 | A1* | 2/2012 | Isotani | B64F 5/00 244/102 R |

(Continued)

FOREIGN PATENT DOCUMENTS

FR    3 036 376 A1    11/2016

OTHER PUBLICATIONS

Search Report issued in corresponding French Application No. 1854843, filed Jun. 4, 2018, 2 pages, Pub Date Dec. 17, 2018.

Primary Examiner — Rodney A Bonnette
(74) Attorney, Agent, or Firm — Christensen O'Connor Johnson Kindness PLLC

(57) ABSTRACT

An aircraft landing gear includes a strut leg, a bottom portion carrying at least one wheel and mounted to slide in the strut leg, and a plurality of elements such as power electric cables, signal-carrying electric cables, and hydraulic pipes extending toward the bottom portion along the strut leg and terminating at the bottom portion, all of the elements being flexible between a bottom end of the strut leg and the bottom portion of the landing gear. The landing gear includes a first movable support having a proximal end hinged to the bottom end of the strut leg, and a distal end carrying a rack for receiving and guiding the flexible elements. The landing gear also includes a second movable support having a distal end hinged to the bottom portion of the landing gear and a proximal end carrying a rack for receiving and guiding the flexible elements.

4 Claims, 3 Drawing Sheets

(56) References Cited

U.S. PATENT DOCUMENTS

2012/0153075 A1\* 6/2012 Wilson ................. B64C 25/405
                                                    244/50
2020/0339250 A1\* 10/2020 Baird ..................... B64C 25/00

\* cited by examiner

AIRCRAFT LANDING GEAR PROVIDED WITH MEANS FOR ROUTING CABLES AND PIPES

CROSS REFERENCE TO RELATED APPLICATION

This application claims priority under 35 U.S.C. § 119 to French Patent Application No. 1854843, filed Jun. 4, 2018, which is herein incorporated by reference in its entirety.

BACKGROUND

Aircraft landing gear may have a bottom portion that carries wheels and is slidably mounted relative to a leg strut, which is itself secured to the structure of the aircraft. It is necessary to bring down to that bottom portion pipes for feeding hydraulic fluid under pressure for the brakes, cables for electrically powering various actuators present on the bottom portion, and cables conveying control signals or measurement signals, and possibly communication buses. Those elements extend down the structure of the aircraft towards the bottom of the strut leg. Rigid elements, such as fluid feed pipes, are then connected to flexible elements in order to go down to the bottom portion along the strut leg while also being compatible with its movements. Landing gear generally includes a scissors linkage having its respective branches hinged to the strut leg and to the bottom portion while also being hinged to each other, and serving to enable the bottom portion of the landing gear to slide relative to the strut leg while preventing any relative rotation between them. Advantage is taken of the scissors linkage in order to fasten supports thereon for guiding the flexible elements from the bottom of the strut leg down to the bottom portion. The flexible elements are held so as to be capable of flexing while the bottom portion is sliding in the strut leg. Where necessary, a dummy scissors linkage is installed on the opposite side to the scissors linkage for the sole function of carrying supports for guiding flexible elements to the bottom portion.

Development is now under way to fit landing gear with wheel drive devices in order to rotate the wheels while the aircraft is on the ground and thus move the aircraft without having recourse to its main engines. Such a drive device comprises one or more electric motors of considerable power, that require an electricity power supply together with signal cables for control purposes. The device may itself be movable between a position in which it is disengaged from the wheels and a position in which it is engaged with the wheels, and that requires a supply of hydraulic fluid in order to feed an actuator for moving the drive device. A drive device therefore requires a significant number of flexible elements to be provided, in addition to those needed for controlling the brakes.

SUMMARY

In an aspect, the present disclosure provides an aircraft landing gear comprising a strut leg for securing to a structure of the aircraft and including a bottom portion carrying at least one wheel and mounted to slide in the strut leg along a sliding axis, and a plurality of elements such as power electric cables, signal-carrying electric cables, and/or hydraulic pipes going down along the strut leg in order to terminate at the bottom portion, all of these elements being flexible between a bottom end of the strut leg and the bottom portion of the landing gear. In some embodiments, the landing gear includes a first movable support having a proximal end hinged to the bottom end of the strut leg about a hinge axis perpendicular to the sliding axis and a distal end carrying a rack provided with orifices for receiving and guiding the flexible elements. The landing gear in some embodiments may additionally include a second movable support having a proximal end hinged to the bottom portion of the landing gear about a hinge axis perpendicular to the sliding axis and a distal end carrying a rack for receiving and guiding the flexible elements.

Thus, the flexible elements are free to flex depending on their own stiffnesses, and the racks accommodate the flexing of the flexible elements while constraining the flexible elements to flex in a plane perpendicular to the hinge axes, thereby preventing them from touching one another. Unlike branches of a scissors linkage, which are hinged to each other and which therefore impose their own movements to the flexible elements, with the landing gear of the present disclosure, the flexible elements impose their movements to the hinged movable supports. The curvature adopted by the flexible elements can then vary over time as a function of movements of the aircraft or of the impacts to which it is subjected, or as a function of the aging of the flexible elements.

In another aspect of the present disclosure, at least one rack is optionally provided, comprising a plate that is pierced by orifices for guiding the flexible elements and that is pivotally mounted on the associated movable support to pivot about a pivot axis parallel to the hinge axis of the movable support.

An embodiment of the landing gear of the present disclosure also provides landing gear in which the bottom portion is provided with a wheel drive device, the second support element then being hinged directly to the wheel drive device.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

Figure 1:
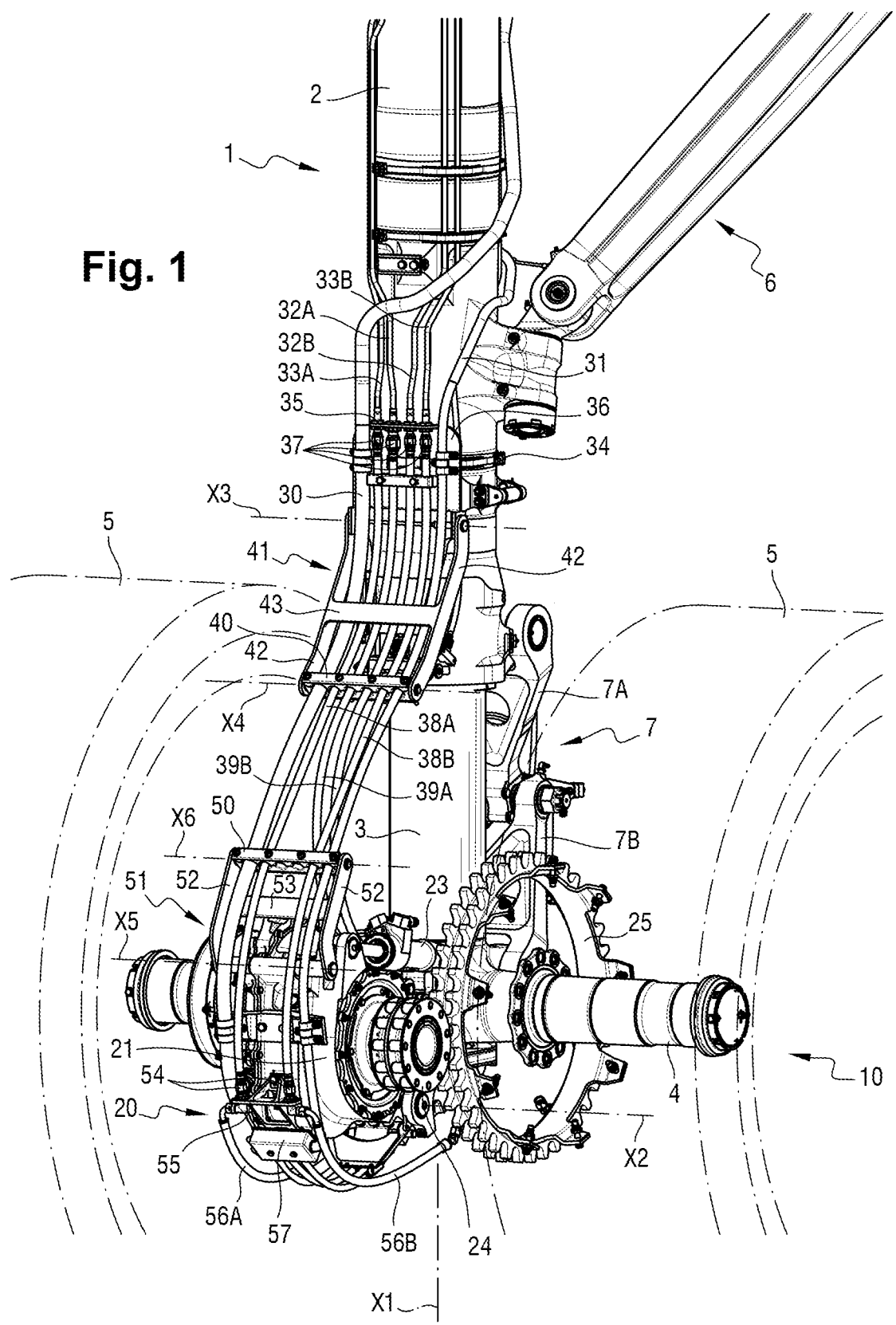
FIG. 1 shows a rear view in perspective of landing gear having a slidable bottom portion fitted with a wheel drive device, the landing gear being shown in its extended position with the wheel drive device in its disengaged position.
Figure 2:
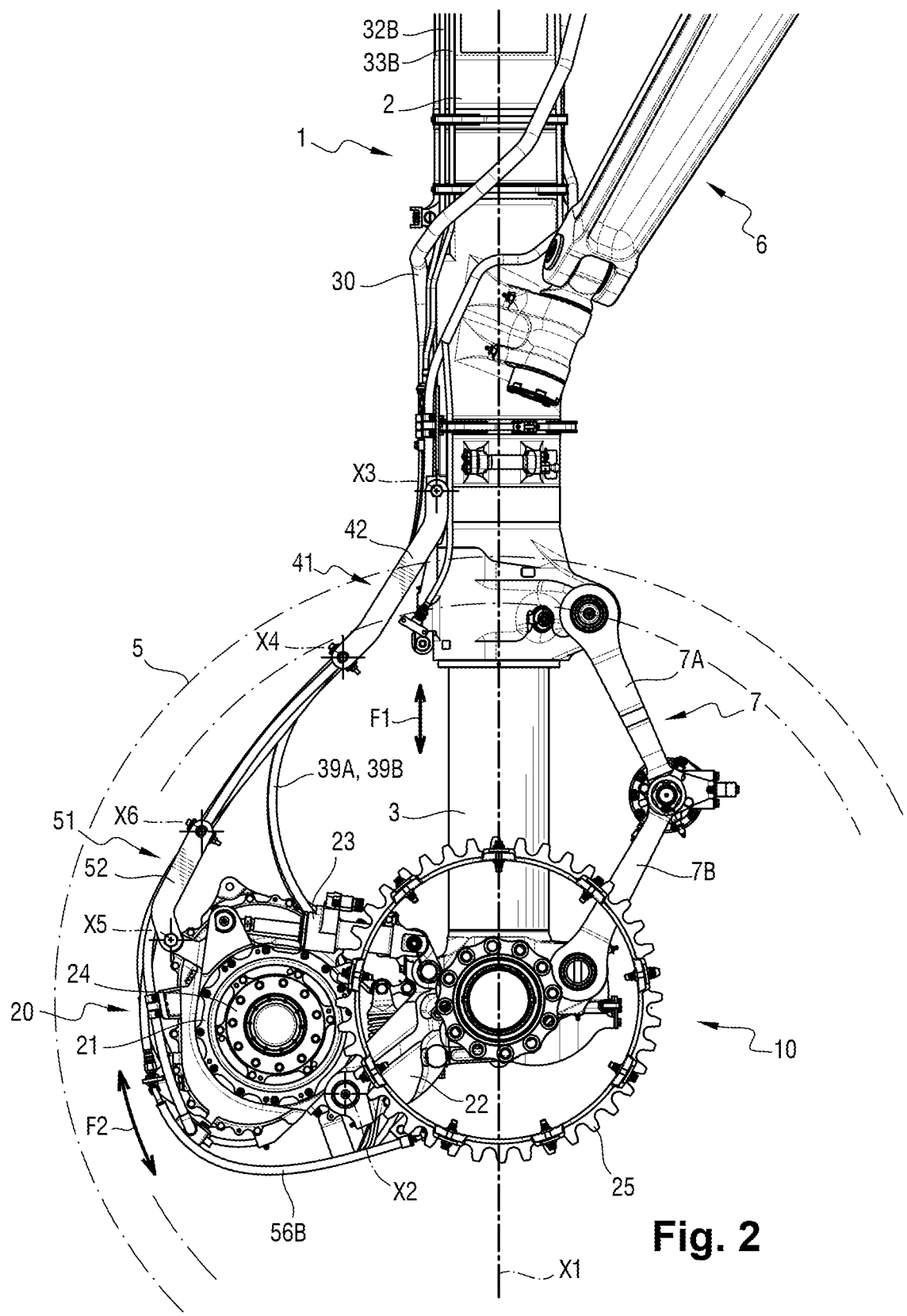
FIG. 2 shows a side view of the FIG. 1 landing gear, in the same position.
Figure 3:
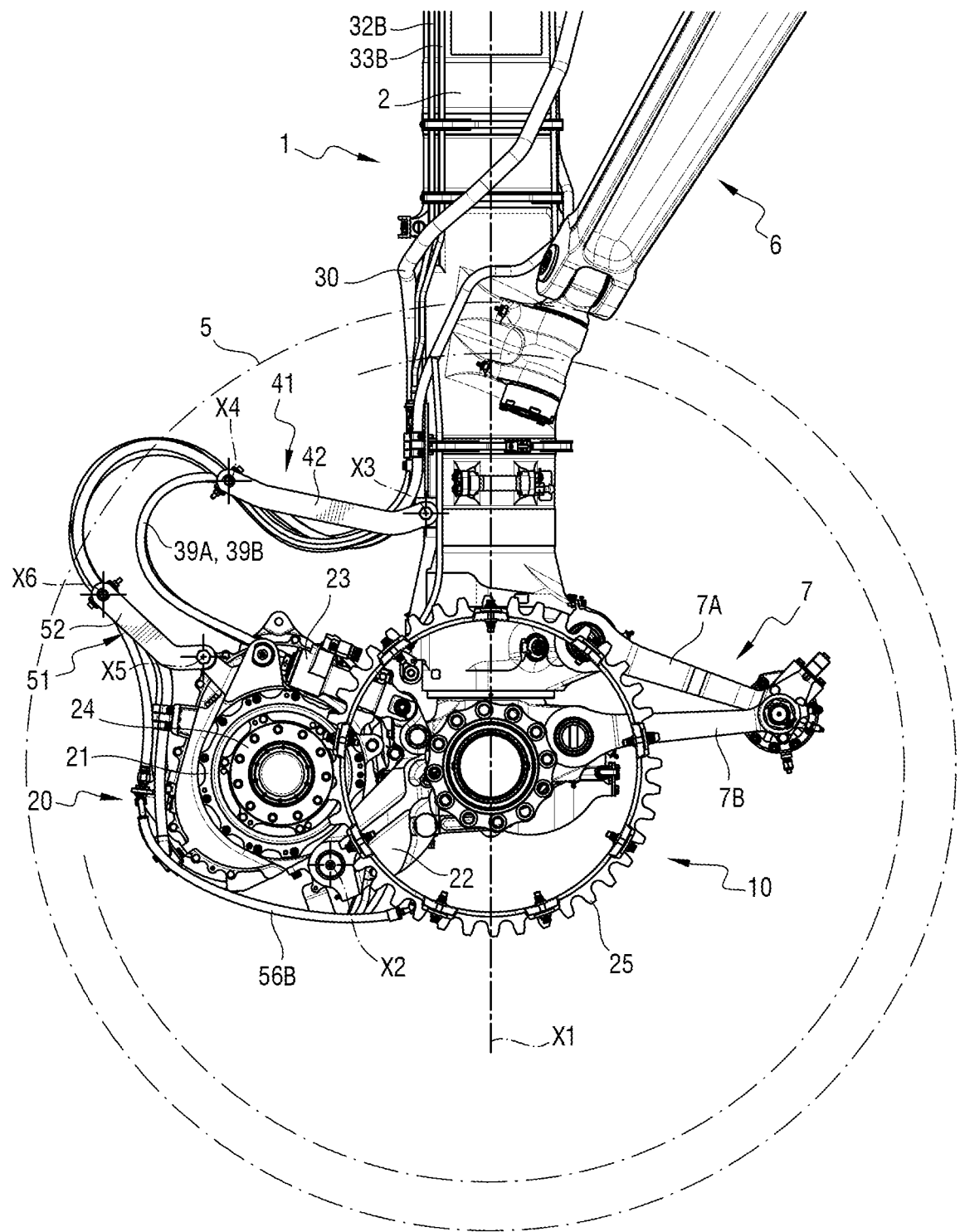
FIG. 3 is a view analogous to the view of FIG. 2, the landing gear being shown in its compressed position with the wheel drive device in the engaged position.

With reference to FIGS. 1-3, an aircraft landing gear 1 comprises a strut leg 2 hinged to the structure of the aircraft and having a shock absorber rod 3 mounted to slide therein along a sliding axis X1. At its bottom end, the rod 3 carries an axle 4 that is to receive wheels 5, which wheels are provided with a brake device (not shown). The rod 3 and the wheels 5 form the bottom portion 10 of the landing gear 1, which is movable along arrow F1 in FIG. 2. A brake 6 stabilizes the strut leg 2 in its deployed position as shown. A scissors linkage 7 comprising two hinged-together branches 7A and 7B, having a top branch 7A hinged to the strut leg 2 and a bottom branch 7B hinged to the rod 3 allows the bottom portion 10 to slide relative to strut leg 2, while preventing any swiveling of the bottom portion 10. In this non-limiting example, the bottom portion 10 is provided with a wheel drive device 20 comprising a motor 21 hinge-mounted to a support 22 fastened to the rod 3, the hinge having an axis X2 that is perpendicular to the axis X1. A linear actuator 23, in this example a hydraulic actuator, is coupled between the rod 3 and the drive device 20 in order to move it (along arrow F2 in FIG. 2) between an engaged position as shown in FIG. 3 in which a roller pinion 24 driven by the motor 21 co-operates with a sprocket 25 secured to one of the wheels 5 in order to drive it in rotation, and a disengaged position shown in FIGS. 1 and 2 in which the roller pinion 24 is spaced apart from the sprocket 25.

Various cables and pipes extend down along the strut leg 2 towards the bottom portion 10 in order to be connected to devices carried by the bottom portion 10, including the drive device 20 and the brake device (not shown). In the FIGURES there can be seen:
  a flexible electric cable 30 for powering the motor 21 of the drive device 20;
  a flexible electric cable 31 for returning signals from various sensors provided on the drive device 20 and/or signals for managing the landing gear, such as tire pressure, brake temperature, etc.;
  rigid hydraulic fluid pipes 32A and 32B (one pipe for feeding fluid under pressure and a return pipe) for operating the movement actuator 23; and
  rigid pipes 33A and 33B for conveying hydraulic fluid under pressure to the brakes of the wheel brake device.

As can be seen in FIG. 2, the electric cables 30 and 31 are held by a collar 34 clamped around the strut leg 2, while the rigid hydraulic pipes 32A, 32B, 33A, and 33B terminate at a plate 35 made integrally with a stationary support 36 that is secured to the strut leg 2. Connectors 37 enable the rigid hydraulic pipes 32A, 32B, 33A, and 33B to be connected to respective flexible hoses 38A, 38B, 39A, and 39B.

Embodiments of the present disclosure relate to the way in which these flexible elements are brought down to the bottom portion 10 of the landing gear. For example, the cables 30 and 31 and the flexible hoses 38A, 38B, 39A, and 39B extend down towards the bottom portion 10 while being received in and guided by a first rack 40 carried by a first movable H-shaped support 41 comprising two arms 42 connected together by a crossbar 43. The first rack 40 is carried at the distal ends of the arms 42, which have their proximal ends hinged about an axis X3 to the bottom of the stationary support 36, and thus to the bottom end of the strut leg 2. In this non-limiting example, the first rack 40 comprises a plate pierced with guide orifices and mounted on the arms 42 to pivot about an axis X4 parallel to the axis X3.

In this non-limiting example, the flexible hoses 38A and 38B are connected directly to the actuator 23 on leaving the first rack 40. The flexible hoses 39A and 39B, and the cables 30 and 31 are received in and guided by a second rack 50 carried by a second movable H-shaped support 51 comprising two arms 52 that are connected together by a crossbar 53. The second rack 50 is carried at the distal ends of the arms 52, which have their proximal ends hinged to the bottom portion of the landing gear, in this non-limiting example, hinged directly to the drive device 20. The second rack 50 comprises a plate pierced by guide orifices and mounted on the arms 52 to pivot about an axis X6 parallel to the axis X5. In this example, the axes X3, X4, X5, and X6 are mutually parallel and all of them are perpendicular to the sliding axis X1. The flexible hoses 39A and 39B terminate at a plate 55 carried by the drive device 20 in order to be connected, via connectors 54, to flexible hoses 56A and 56B that pass under the drive device 20 and that feed the brakes. The signal cable 31 is connected to a connection box 57 of the drive device 20, while the power cable 30 is connected directly to the motor 21.

The use of two racks carried by hinged supports for the purpose of guiding the flexible elements allows said flexible elements to adopt a loop shape that is determined essentially by the stiffest flexible element. FIG. 2 shows the situation in which the landing gear is in its extended position and the drive device 20 is in its disengaged position, i.e. the situation in which the plate 55 and the connection box 57 are furthest away from the plate 35 of the strut leg 2, and FIG. 3 shows the situation in which the landing gear is in its fully compressed position (e.g. if the shock absorber is deflated) and the drive device 20 is in its engaged position, thus the situation in which the plate 55 and the connection box 57 are at their closest to the plate 35 of the strut leg 2. The flexible elements can then flex in parallel planes while being guided by the racks 40 and 50 having respective hinged supports 41 and 51 that do no more than accompany the natural flexing of the flexible elements, without constraining their flexing.

The present disclosure is not limited to examples set forth in the above description, but covers any variant coming within the ambit defined by the claims. For example, although the racks 40 and 50 in this example are hinge-mounted on the flexible supports 41 and 51, they could be mounted stationary relative thereto.

Although the systems and structures of the present disclosure are applied in this example to landing gear having a wheel drive device, those systems and structures could naturally be applied to landing gear without a drive device, the second movable support remaining hinged to the bottom portion of the landing gear, e.g. directly to the sliding rod, or if the landing gear has a bogey, to the rocker of the bogey.

While illustrative embodiments have been illustrated and described, it will be appreciated that various changes can be made therein without departing from the spirit and scope of the disclosure.

The invention claimed is:
1. An aircraft landing gear comprising:
  a strut leg configured to secure to a structure of an aircraft;

a bottom portion carrying at least one wheel and mounted to slide in the strut leg along a sliding axis;

a plurality of flexible elements extending down along the strut leg and terminating at the bottom portion, all of the plurality of elements being flexible between a bottom end of the strut leg and the bottom portion of the aircraft landing gear;

a first movable support having a proximal end hinged to the bottom end of the strut leg about a hinge axis perpendicular to the sliding axis and a free distal end carrying a rack provided with orifices for receiving and guiding the plurality of flexible elements; and a second movable support having a proximal end hinged to the bottom portion of the aircraft landing gear about a hinge axis perpendicular to the sliding axis and a free distal end carrying a rack for receiving and guiding the plurality of flexible elements.

2. The aircraft landing gear according to claim 1, wherein at least one of the rack of the first movable support or the rack of the second movable support comprises a plate having orifices for guiding the plurality of flexible elements and that is pivotally mounted on the associated movable support to pivot about a pivot axis parallel to the hinge axis of the associated movable support.

3. The aircraft landing gear according to claim 1, wherein the bottom portion of the aircraft landing gear further comprises a drive device configured to drive the at least one wheel in rotation, and wherein the second movable support is hinged directly to the drive device.

4. The aircraft landing gear according to claim 1, wherein the plurality of flexible elements includes at least one flexible element selected from the group consisting of: a power electric cable, a signal-carrying electric cable, and a hydraulic pipe.

* * * * *